US011068399B2

United States Patent
Li et al.

(10) Patent No.: US 11,068,399 B2
(45) Date of Patent: Jul. 20, 2021

(54) TECHNOLOGIES FOR ENFORCING COHERENCE ORDERING IN CONSUMER POLLING INTERACTIONS BY RECEIVING SNOOP REQUEST BY CONTROLLER AND UPDATE VALUE OF CACHE LINE

(71) Applicant: Intel Corporation, Santa Clara, CA (US)

(72) Inventors: Bin Li, Portland, OR (US); Chunhui Zhang, Hillsboro, OR (US); Ren Wang, Portland, OR (US); Ram Huggahalli, Costa Mesa, CA (US)

(73) Assignee: Intel Corporation, Santa Clara, CA (US)

( * ) Notice: Subject to any disclaimer, the term of this patent is extended or adjusted under 35 U.S.C. 154(b) by 770 days.

(21) Appl. No.: 15/720,379

(22) Filed: Sep. 29, 2017

(65) Prior Publication Data

US 2019/0102301 A1    Apr. 4, 2019

(51) Int. Cl.
| | | |
|---|---|---|
| *G06F 12/00* | (2006.01) | |
| *G06F 12/0831* | (2016.01) | |
| *G06F 9/30* | (2018.01) | |
| *G06F 9/46* | (2006.01) | |
| *H04L 12/933* | (2013.01) | |
| *H04L 12/741* | (2013.01) | |
| *H04L 12/861* | (2013.01) | |

(52) U.S. Cl.
CPC ........ *G06F 12/0831* (2013.01); *G06F 9/3004* (2013.01); *G06F 9/466* (2013.01); *H04L 45/74* (2013.01); *H04L 49/15* (2013.01); *G06F 2212/1016* (2013.01); *G06F 2212/621* (2013.01); *H04L 49/9047* (2013.01)

(58) Field of Classification Search
CPC .... G06F 12/0831; G06F 9/3004; G06F 9/466; H04L 45/74; H04L 49/15
See application file for complete search history.

(56) References Cited

U.S. PATENT DOCUMENTS

| | | | | |
|---|---|---|---|---|
| 6,640,289 | B2 * | 10/2003 | McCrory | ............ G06F 12/0815 |
| | | | | 711/120 |
| 9,323,676 | B2 * | 4/2016 | Bronson | ............. G06F 12/0831 |
| 10,073,775 | B2 * | 9/2018 | Wilerkson | .......... G06F 12/0808 |
| 2011/0040911 | A1 * | 2/2011 | Vasudevan | .......... G06F 12/0835 |
| | | | | 710/100 |

\* cited by examiner

*Primary Examiner* — Tammara R Peyton
(74) *Attorney, Agent, or Firm* — Compass IP Law PC (57) ABSTRACT

Technologies for enforcing coherence ordering in consumer polling interactions include a network interface controller (NIC) of a target computing device which is configured to receive a network packet, write the payload of the network packet to a data storage device of the target computing device, and obtain, subsequent to having transmitted a last write request to write the payload to the data storage device, ownership of a flag cache line of a cache of the target computing device. The NIC is additionally configured to receive a snoop request from a processor of the target computing device, identify whether the received snoop request corresponds to a read flag snoop request associated with an active request being processed by the NIC, and hold the received snoop request for delayed return in response to having identified the received snoop request as the read flag snoop request. Other embodiments are described herein.

25 Claims, 5 Drawing Sheets

TECHNOLOGIES FOR ENFORCING COHERENCE ORDERING IN CONSUMER POLLING INTERACTIONS BY RECEIVING SNOOP REQUEST BY CONTROLLER AND UPDATE VALUE OF CACHE LINE

BACKGROUND

In present packet-switched network architectures, data is transmitted in the form of network packets between computing devices and/or device components at a rapid pace. At a high level, data is packetized into a network packet, which is transmitted by a network interface controller (NIC) of one network computing device and received by a NIC of another network computing device. Upon receipt, the network packet is typically processed, classified, etc., and the payload is typically written to memory (e.g., cache, main memory, etc.). Upon having written all of the payload data to memory, the receiving NIC may then notify a control processing unit (CPU) that the data is available for further processing. In most networked computing systems, network packet processing speed is a critical priority. As such, various mechanisms have been developed and employed to increase the speed at which network packets are processed upon receipt. However, present techniques can introduce inefficiencies, such as latency and additional energy consumption, or otherwise have a negative performance impact.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
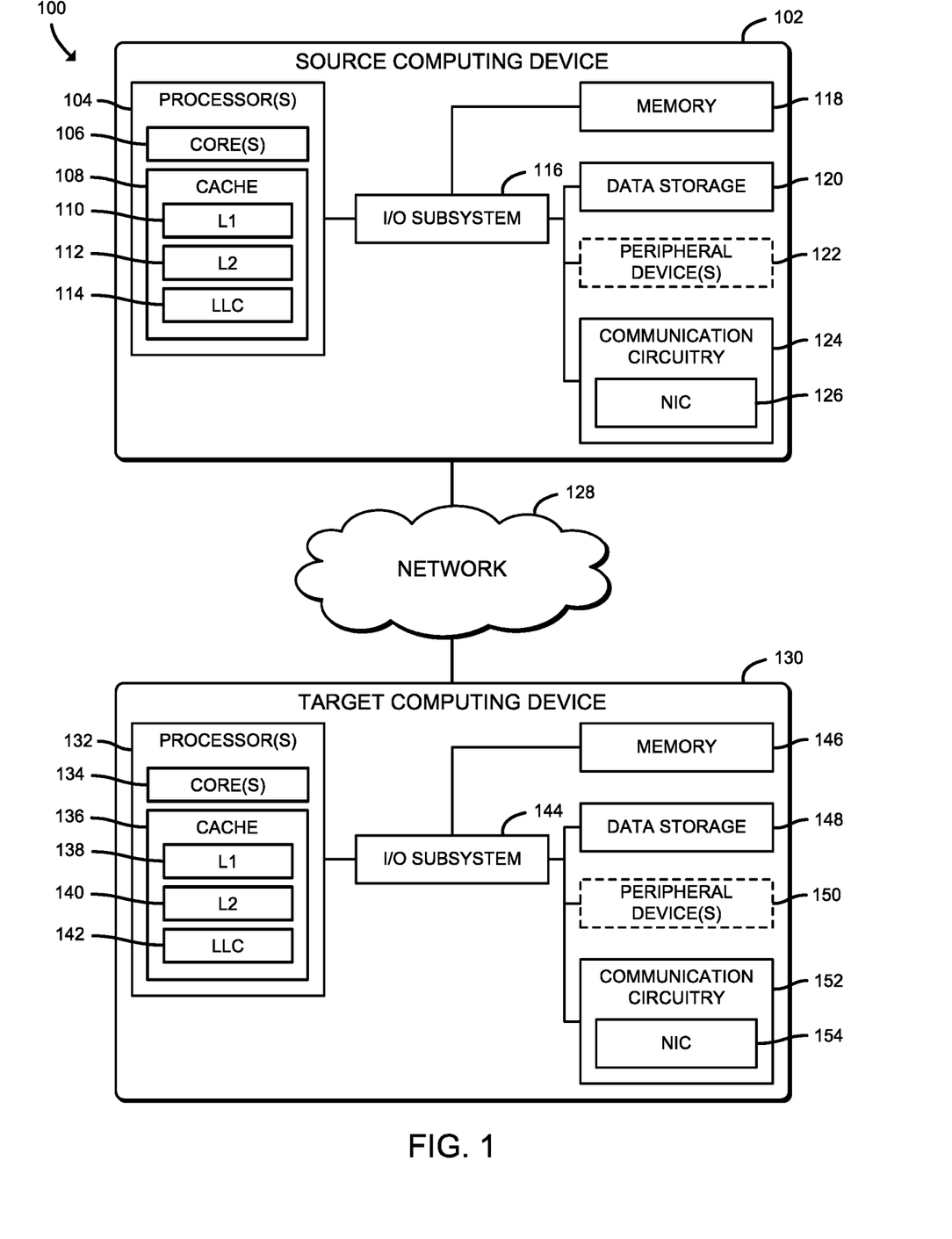
FIG. 1 is a simplified block diagram of at least one embodiment of a system for enforcing coherence ordering in consumer polling interactions that includes a source computing device coupled to a target computing device via a network.

Referring now to FIG. 1, in an illustrative embodiment, a system 100 for enforcing coherence ordering in consumer polling interactions includes a source computing device 102 in network communication with a target computing device 130 via a network 128. In use, a processor of the source computing device 102 identifies data to be transmitted to the target computing device 130 and sends the data to a network interface controller (NIC) of the source computing device 102. The NIC of the source computing device 102 (see, e.g., the NIC 126) then packetizes the data and transmits the data via a payload in a network packet to the target computing device 130.

Upon receipt of each network packet, the NIC of the target computing device 130 (see, e.g., the NIC 154) parses each network packet to extract information from the payload, as well as any respective header(s), and stores the payload data into a storage location (e.g., a cache memory, main memory, etc.) of the target computing device 130, which is typically defined by the processor responsible for processing that particular network packet. Subsequent to the payload data being stored, a processor of the target computing device 130 (see, e.g., the processor(s) 132) may then process the payload data and perform an action as a function of the data contained within the payload.

Typically, the entirety of the payload data to be stored is required to be stored before the processor begins processing the payload data. As such, the NIC is generally configured to indicate the write status to the processor indicating whether the payload data has been completely written to data storage location. One such existing procedure for indicating the state of writing the payload data to a data storage location includes using a value of a flag to indicate the state. For example, if the NIC is still in the process of writing the payload data to the data storage location, the value of the flag may be "0," while the value of the flag upon successfully storing the entirety of the payload data may be "1." Accordingly, upon reading the flag, the processor can identify whether the payload data is ready to be processed.

However, present techniques can result in a ping-pong effect between the NIC and the processor, a result of the processor continuously polling the flag during the write until the flag state indicates the write is complete. Additionally, existing workarounds can result in inefficiencies (e.g., greater energy consumption, increased latency, etc.) or are impractical in reality. Unlike present techniques, as will be described in further detail below, the NIC of the target computing device 130 as described herein is configured to eliminate the need for continuous polling by holding onto ownership of the flag and only responding to the initial poll upon completion of the payload data write. In other words, the processor only needs to poll once and the NIC does not need to give up ownership of the flag until the flag is set to indicate the write is complete.

The source computing device 102 may be embodied as any type of computation or computer device capable of performing the functions described herein, including, without limitation, a mobile computing device (e.g., a smartphone, a tablet computer, a laptop computer, a notebook computer, a wearable device), a desktop computer, a server (e.g., stand-alone, rack-mounted, blade, etc.), switch (e.g., a disaggregated switch, a rack-mounted switch, a standalone switch, a fully managed switch, a partially managed switch, a full-duplex switch, and/or a half-duplex communication mode enabled switch), a router, a network appliance (e.g., physical or virtual), a web appliance, a distributed computing system, a processor-based system, and/or a multiprocessor system. As shown in FIG. 1, the illustrative source computing device 102 includes one or more processors 104, an input/output (I/O) subsystem 116, a memory 118, a data storage device 120, communication circuitry 124, and, in some embodiments, one or more peripheral devices 122. Of course, in other embodiments, the source computing device 102 may include alternative or additional components, such as those commonly found in a computing device (e.g., a graphics processing unit (GPU), a power supply, fans, etc.). Additionally, in some embodiments, one or more of the illustrative components may be incorporated in, or otherwise form a portion of, another component. For example, the memory 118, or portions thereof, may be incorporated into one or more of the processors 104, in some embodiments. Further, in some embodiments, one or more of the illustrative components may be omitted from the source computing device 102.

The illustrative processor 104 includes one or more processor cores 106, each of which may be embodied as an independent logical execution unit capable of executing programmed instructions. Accordingly, the processor(s) 104 may be embodied as any type of central processing unit capable of carrying out instructions to perform the functions described herein. For example, the processor(s) 104 may be embodied as one or more single core processors, multi-core processors, digital signal processors (DSPs), field programmable gate arrays (FPGAs), microcontrollers, or other processor(s) or processing/controlling circuit(s). It should be appreciated that, in some embodiments of the source computing device 102 (e.g., a supercomputer), the source computing device 102 may include thousands of processor cores 106. It should be further appreciated that, in some embodiments, each processor 104 may be connected to a physical connector, or socket, on a motherboard (not shown) of the source computing device 102 configured to accept a single physical processor package (i.e., a multi-core physical integrated circuit). In some embodiments, the source computing device 102 may include more than one physical processor package, each of which may be connected to the motherboard of the source computing device 102 via an individual socket coupled to one or more independent hardware memory slots.

The illustrative processor 104 additionally includes a cache memory 108, which may be embodied as any type of cache that the processor 104 can access more quickly than the memory 118 (i.e., main memory), such as an on-die cache, or on-processor cache. In other embodiments, the cache memory 108 may be an off-die cache, but reside on the same system-on-a-chip (SoC) as the processor 104. The illustrative cache memory 108 includes a multi-level cache architecture embodied as a level 1 cache designated as L1 cache 110, a level 2 cache designated as L2 cache 112, and a last-level cache designated as LLC 114. It should be appreciated that, in some embodiments, the multi-level cache architecture may include additional and/or alternative levels of cache memory.

The memory 118 may be embodied as any type of volatile or non-volatile memory or data storage capable of performing the functions described herein. In operation, the memory 118 may store various data and software used during operation of the source computing device 102, such as operating systems, applications, programs, libraries, and drivers. The memory 118 is communicatively coupled to the processor 104 via the I/O subsystem 116, which may be embodied as circuitry and/or components to facilitate input/output operations with the processor 104, the memory 118, and other components of the source computing device 102. For example, the I/O subsystem 116 may be embodied as, or otherwise include, memory controller hubs, input/output control hubs, firmware devices, communication links (i.e., point-to-point links, bus links, wires, cables, light guides, printed circuit board traces, etc.), and/or other components and subsystems to facilitate the input/output operations. In some embodiments, the I/O subsystem 116 may form a portion of a SoC and be incorporated, along with the processor 104, the memory 118, and other components of the source computing device 102, on a single integrated circuit chip.

The data storage device 120 may be embodied as any type of device or devices configured for short-term or long-term storage of data such as, for example, memory devices and circuits, memory cards, hard disk drives, solid-state drives, or other data storage devices. It should be appreciated that the data storage device 120 and/or the memory 118 (e.g., the computer-readable storage media) may store various data as described herein, including operating systems, applications, programs, libraries, drivers, instructions, etc., capable of being executed by a processor (e.g., the processor 104) of the source computing device 102.

The communication circuitry 124 may be embodied as any communication circuit, device, or collection thereof, capable of enabling communications between the source computing device 102 and other computing devices, such as the target computing device 130, as well as any network communication enabling devices, such as an access point, network switch/router, etc., to allow communication over the network 128. The communication circuitry 124 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

In some embodiments, performance of one or more of the functions of communication circuitry 124 as described herein may be performed by specialized circuitry, hardware, or combination thereof of the communication circuitry 124, which may be embodied as a SoC or otherwise form a portion of a SoC of the source computing device 102 (e.g., incorporated on a single integrated circuit chip along with the processor 104, the memory 118, and/or other components of the source computing device 102). Alternatively, in some embodiments, the specialized circuitry, hardware, or combination thereof may be embodied as one or more discrete processing units of the source computing device 102, each of which may be capable of performing one or more of the functions described herein.

The illustrative communication circuitry 124 includes a NIC 126. The NIC 126 may be embodied as one or more add-in-boards, daughtercards, network interface cards, controller chips, chipsets, or other devices that may be used by the source computing device 102. In some embodiments, for example, the NIC 126 may be integrated with the processor 104, embodied as an expansion card coupled to the I/O subsystem 116 over an expansion bus (e.g., PCI Express (PCI-e)), included as a part of a SoC that includes one or more processors, or included on a multichip package that also contains one or more processors.

It should be appreciated that, in some embodiments, the communication circuitry 124 may include specialized circuitry, hardware, or combination thereof to perform pipeline logic (e.g., hardware algorithms) for performing the functions described herein, including processing network packets (e.g., parse received network packets, determine destination computing devices for each received network packets, forward the network packets to a particular buffer queue of a respective host buffer of the source computing device 102, etc.), perform computational functions, etc.

The peripheral device(s) 122 may include any type of device that is usable to input information into the source computing device 102 and/or receive information from the source computing device 102. The peripheral devices 122 may be embodied as any auxiliary device usable to input information into the source computing device 102, such as a keyboard, a mouse, a microphone, a barcode reader, an image scanner, etc. or output information from the source computing device 102, such as a display, a speaker, graphics circuitry, a printer, a projector, etc. It should be appreciated that, in some embodiments, one or more of the peripheral devices 122 may function as both an input device and an output device (e.g., a touchscreen display, a digitizer on top of a display screen, etc.). It should be further appreciated that the types of peripheral devices 122 connected to the source computing device 102 may depend on, for example, the type and/or intended use of the source computing device 102. Additionally or alternatively, in some embodiments, the peripheral devices 122 may include one or more ports, such as a USB port, for example, for connecting external peripheral devices to the source computing device 102.

The network 128 may be embodied as any type of wired or wireless communication network, including but not limited to a wireless local area network (WLAN), a wireless personal area network (WPAN), a cellular network (e.g., Global System for Mobile Communications (GSM), Long-Term Evolution (LTE), etc.), a telephony network, a digital subscriber line (DSL) network, a cable network, a local area network (LAN), a wide area network (WAN), a global network (e.g., the Internet), or any combination thereof. It should be appreciated that, in such embodiments, the network 128 may serve as a centralized network and, in some embodiments, may be communicatively coupled to another network (e.g., the Internet). Accordingly, the network 128 may include a variety of other virtual and/or physical network computing devices (e.g., routers, switches, network hubs, servers, storage devices, compute devices, etc.), as needed to facilitate communication between the source computing device 102 and the target computing device 130, which are not shown to preserve clarity of the description.

Similar to the source computing device 102, the target computing device 130 may be embodied as any type of computation or computer device capable of performing the functions described herein, including, without limitation, a mobile computing device (e.g., a smartphone, a tablet computer, a laptop computer, a notebook computer, a wearable device), a desktop computer, a server (e.g., stand-alone, rack-mounted, blade, etc.), switch (e.g., a disaggregated switch, a rack-mounted switch, a standalone switch, a fully managed switch, a partially managed switch, a full-duplex switch, and/or a half-duplex communication mode enabled switch), a router, a network appliance (e.g., physical or virtual), a web appliance, a distributed computing system, a processor-based system, and/or a multiprocessor system.

As shown in FIG. 1, similar to the previously described source computing device 102, the illustrative target computing device 130 includes a processor 132 with one or more cores 134 and a cache 136 (i.e., that includes an L1 cache 138, an L2 cache 140, and a LLC 142), an I/O subsystem 144, a memory 146, a data storage device 148, communication circuitry 152 with a NIC 154, and, in some embodiments, one or more peripheral devices 150. As such, further descriptions of the like components are not repeated herein for clarity of the description with the understanding that the description of the corresponding components provided above in regard to the source computing device 102 applies equally to the corresponding components of the target computing device 130. Of course, it should be appreciated that the target computing device 130 may include additional and/or alternative components, depending on the embodiment. Additionally, in some embodiments, one or more of the illustrative components may be incorporated in, or otherwise form a portion of, another component.

Figure 2:
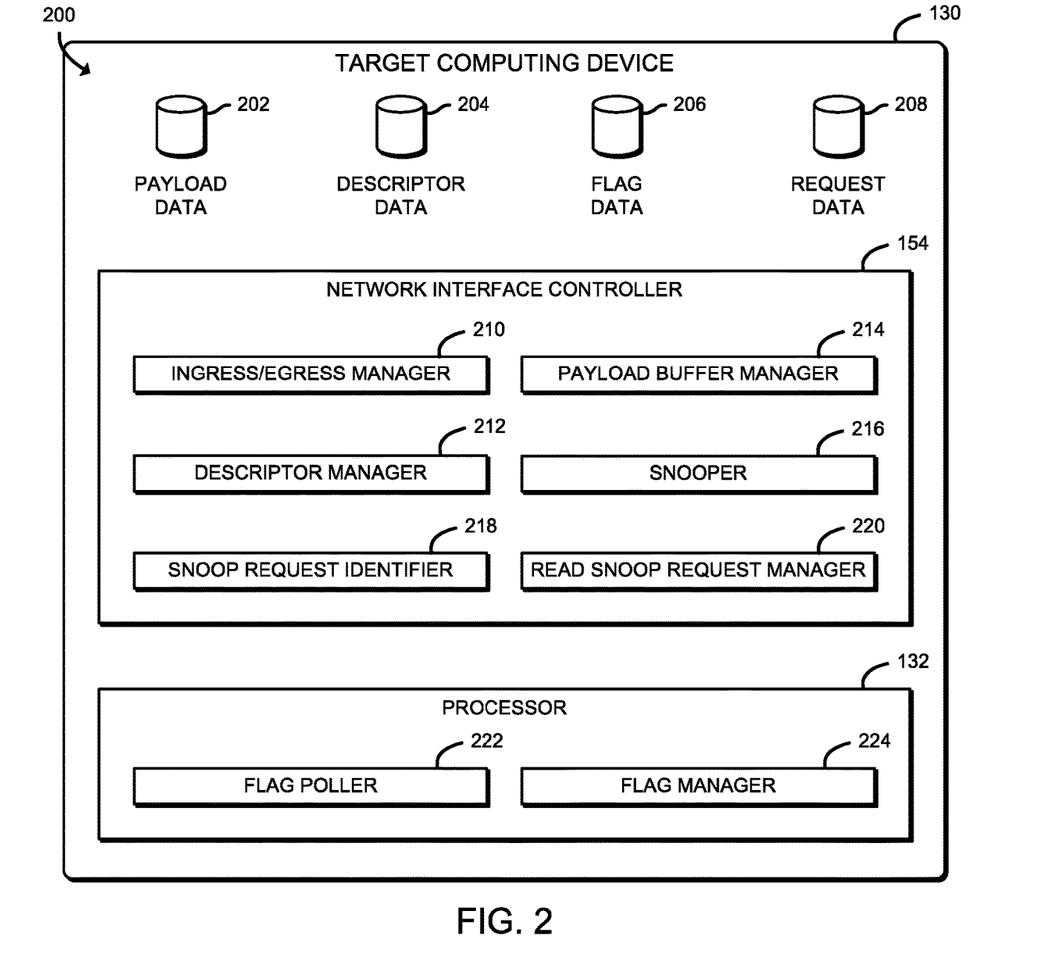
FIG. 2 is a simplified block diagram of at least one embodiment of an environment of the target computing device of the system of FIG. 1.

Referring now to FIG. 2, in use, the target computing device 130 establishes an environment 200 during operation. The illustrative environment 200 includes the processor 132 and the NIC 154 of FIG. 1. The illustrative NIC 154 includes an ingress/egress manager 210, a descriptor manager 212, a payload buffer manager 214, a snooper 216, a snoop request identifier 218, and a read snoop request manager 220. The illustrative processor 132 includes a flag poller 222 and a flag manager 224. The various components of the environment 200 may be embodied as hardware, firmware, software, or a combination thereof. As such, in some embodiments, one or more of the components of the environment 200 may be embodied as circuitry or collection of electrical devices (e.g., ingress/egress management circuitry 210, descriptor management circuitry 212, payload buffer management circuitry 214, snooper circuitry 216, snoop request identification circuitry 218, read snoop request management circuitry 220, flag poller circuitry 222, a flag management circuitry 224, etc.).

It should be appreciated that, in some embodiments, one or more of the illustrative components may form a portion of another component and/or one or more of the illustrative components may be independent of one another. Further, in some embodiments, one or more of the components of the environment 200 may be embodied as virtualized hardware components or emulated architecture, which may be established and maintained by the processor 132, the NIC 154, or other component(s) of the target computing device 130. It should be appreciated that the target computing device 130 may include other components, sub-components, modules, sub-modules, logic, sub-logic, and/or devices commonly found in a computing device, which are not illustrated in FIG. 2 for clarity of the description.

In the illustrative environment 200, the target computing device 130 additionally includes payload data 202, descriptor data 204, flag data 206, and request data 208, each of which may be accessed by the various components and/or sub-components of the target computing device 130. Further, each of the payload data 202, the descriptor data 204, the flag data 206, and the request data 208 may be accessed by the various components of the target computing device 130. Additionally, it should be appreciated that in some embodiments the data stored in, or otherwise represented by, each of the payload data 202, the descriptor data 204, the flag data 206, and the request data 208 may not be mutually exclusive relative to each other. For example, in some implementations, data stored in the payload data 202 may also be stored as a portion of one or more of the descriptor data 204, the flag data 206, and/or the request data 208. As such, although the various data utilized by the target computing device 130 is described herein as particular discrete data, such data may be combined, aggregated, and/or otherwise form portions of a single or multiple data sets, including duplicative copies, in other embodiments.

The ingress/egress manager 210, which may be embodied as hardware, firmware, software, virtualized hardware, emulated architecture, and/or a combination thereof as discussed above, is configured to receive inbound and route/transmit outbound network traffic. Accordingly, the ingress/egress manager 210 is configured to facilitate inbound network communications (e.g., network traffic, network packets, network flows, etc.) to the target computing device 130 by managing (e.g., create, modify, delete, etc.) connections to physical and virtual network ports (i.e., virtual network interfaces) of the target computing device 130 (e.g., via the communication circuitry 152), as well as the ingress buffers/queues associated therewith.

Additionally, the ingress/egress manager 210 is configured to facilitate outbound network communications (e.g., network traffic, network packet streams, network flows, etc.) from the target computing device 130 by managing (e.g., create, modify, delete, etc.) connections to physical and virtual network ports/interfaces of the target computing device 130 (e.g., via the communication circuitry 152), as well as the egress buffers/queues associated therewith. Further, the ingress/egress manager 210 is configured to construct/add the appropriate headers at the applicable layers to the network packet, the payload (i.e., the data segment), and any footers, such as may be used to store error-detecting code (e.g., cyclic redundancy check (CRC) data verification information). The payloads of such inbound/outbound network communications may be stored in the payload data 202, in some embodiments.

The descriptor manager 212, which may be embodied as hardware, firmware, software, virtualized hardware, emulated architecture, and/or a combination thereof as discussed above, is configured to match information associated with the network packet to a descriptor (i.e., an address mapping descriptor) which is mapped to a memory location (i.e., an address of a receiving memory buffer) to write the payload data of the network packet to. To do so, the descriptor manager 212 may be configured to extract information from the network packet, or a portion thereof, or otherwise identify information associated with the network packet which is usable to determine a matching address mapping descriptor (e.g., based on the descriptor mapping information). Such information may include metadata stored in a header of the network packet, a payload type (e.g., audio, video, text, etc.) of the network packet, a flow associated with the network packet, etc.

In some embodiments, the descriptor mapping information may be provided by one or more processors (e.g., the processor 132 of the illustrative environment 200). Accordingly, in such embodiments, the descriptor manager 212 may be additionally configured to manage (e.g., store, update, remove, etc.) the received descriptor mapping information. The descriptor manager 212 may be configured to store the descriptor mapping information in the descriptor data 204, in some embodiments.

The payload buffer manager 214, which may be embodied as hardware, firmware, software, virtualized hardware, emulated architecture, and/or a combination thereof as discussed above, is configured to manage the writing of the payload to the appropriate memory location, such as may be determined by the descriptor manager 212. To do so, the payload buffer manager 214 is configured to determine a number of write commands to be issued, such as may be based on a size and/or type of the payload. In other words, the payload buffer manager 214 may be configured to issue multiple write commands to the applicable memory based on at least one property associated with the payload.

In an illustrative embodiment in which a received payload is to be stored in 64 cache lines (e.g., representative of a 4 KB payload) of a LLC (e.g., the LLC 142 of FIG. 1), the 64 cache lines of the LLC corresponding to the memory address as indicated by the descriptor of the network packet from which the payload was received, as noted above, the payload buffer manager 214 is configured to issue 64 write commands It should be appreciated that the payload buffer manager 214 may be configured to issue a corresponding number of write requests to a memory controller, a cache controller, or an agent of the memory (e.g., a cache home agent (CHA)), and subsequently write the payload data upon receiving an indication from the memory/cache controller, or agent, that the payload data associated with the request can be written to the requested memory address.

The payload buffer manager 214 is additionally configured to manage a state of a flag in a flag cache line that is indicative of whether a payload has been written to a data storage location (e.g., cache, main memory, etc.). Accordingly, the associated processor can request a value of the flag and determine whether to take a subsequent action (e.g., process the payload) as a function of the value of the flag. To manage the flag, the payload buffer manager 214 is configured to gain ownership of the flag cache line (e.g., after sending the last write request in the series of write requests), update the flag to represent the current state as appropriate (e.g., a value of "0" to indicate the payload has not been received/stored and a value of "1" to indicate the payload has been written to the appropriate data storage location). As such, ownership of the flag cache line can be obtained by the processor upon request.

The snooper 216, which may be embodied as hardware, firmware, software, virtualized hardware, emulated architecture, and/or a combination thereof as discussed above, is configured to monitor transactions (e.g., on a bus). To do so, the snooper 216 is configured to employ caching logic to monitor the bus and detect if any cached memory is requested, such as may be requested by a processor. Additionally, upon snooping a transaction on the bus, the snooper 216 is configured to look up a corresponding cache tag to determine whether the snooper has ownership of the cache block associated with the snooped transaction. In other words, the snooper 216 can determine whether a transaction on the bus corresponds to a cache line managed by a particular cache controller. For example, the snooper 216 can determine whether a transaction on the bus corresponds to a flag cache line owned by the payload buffer manager 214. In some embodiments, the snooper 216 may be additionally configured to employ or otherwise function as a snoop filter (i.e., determine whether to check a corresponding cache tag or not).

The flag poller 222, which may be embodied as hardware, firmware, software, virtualized hardware, emulated architecture, and/or a combination thereof as discussed above, is configured to poll (i.e., issue a read request) the flag cache line to determine whether a network packet has been and stored in a data storage location (e.g., a cache memory location, a main memory location, etc.), based on the returned value of the flag cache line. To do so, the flag poller 222 is configured to issue snoop requests on the bus to determine the value of the flag cache line. The flag manager 224, which may be embodied as hardware, firmware, software, virtualized hardware, emulated architecture, and/or a combination thereof as discussed above, is configured to acquire ownership of the flag and update it as necessary (e.g., modify the flag value to "0" after processing the data set).

The snoop request identifier 218 is configured to identify and classify snoop requests and stored in a data storage location (e.g., a cache memory location, a main memory location, etc.) by the NIC 154. For example, in order to allow the NIC 154 to hold the flag until all data of the current buffer has been written, the snoop request identifier 218 is configured to determine whether a snoop request received by the NIC 154 is a read flag snoop request. For example, in some embodiments, the snoop request identifier 218 may be configured to check a pending queue. In such an embodiment, upon receiving the read flag snoop request from the uncore (i.e., from the processor via a controller/agent), the snoop request identifier 218 may be configured to first check if there are any pending write requests in a pending queue which have the same memory storage location address with a strongly ordered bit set, thereby indicating a flag exists. If so, the NIC 154 can delay processing the received read flag snoop request and insert the snoop request into the pending queue and replay it after the write request for the flag in the pending queue has been finished. As such, both the response and the updated flag value can be returned to the requesting processor at the same time.

In another embodiment, the snoop request identifier 218 may be configured to check a special flag buffer. In such an embodiment, upon receiving the read flag snoop request, the snoop request identifier 218 may be configured to add a buffer in the NIC 154 for all flag addresses. As such, when the NIC 154 receives a snoop request from the uncore (i.e., from the processor via a controller/agent), the snoop request identifier 218 may be configured to check the flag buffer to see whether this is a snoop request for a flag. Further, the snoop request identifier 218 may be configured to check if the flag indicates the write is pending (i.e., an address hit) and if so, the NIC 154 can delay processing of the snoop request and insert the snoop request into a pending queue after the write flag request. Accordingly, the NIC 154 can start processing the snoop request after having finished processing the write request for that flag, returning both the response and the updated flag value to the requesting processor at the same time.

However, under certain conditions, a deadlock scenario may be introduced at the uncore (e.g., the memory controller/agent). Such a deadlock may occur when the read flag snoop request is stored by the memory controller/agent in a table of requests (TOR) and waiting for the snoop response from the NIC 154. Since the NIC 154 issues the write request to the memory controller/agent (e.g., via a CHA), while waiting for the TOR entries to be freed up that are occupied by the read flag snoop request, the snoop response cannot be returned to the memory controller/agent for the read flag snoop request because the NIC 154 is waiting for the write request ahead of it to finish. In other words, the write request cannot make forward progress due to all of the TOR entries managed by the memory controller/agent being occupied, resulting in a deadlock.

To avoid such a deadlock scenario, the read snoop request manager 220 is configured to only hold a maximum number of snoops for delayed return (i.e., a maximum number of held snoops). For example, the read snoop request manager 220 may be configured to only hold a maximum number of snoops for delayed return based on the entry size of the TOR of the memory controller/agent, as well as the number of NICs 154 sharing the TOR. In an illustrative example, if a TOR can hold 32 entries, the read snoop request manager 220 may be configured to set the maximum number of snoops held for delayed return at less than 32 (e.g., the maximum number of held snoops may be equal to 31 or less). In furtherance of the illustrative example, if two NICs 154 share the 32-entry TOR, the read snoop request manager 220 may be configured to set the maximum number of snoops held for delayed return at less than half the number of available entries (e.g., the maximum number of held snoops may be equal to 15 or less). In some embodiments, to avoid the deadlock scenario, the read snoop request manager 220 may be configured to manage a counter to keep a count of the number of delayed snoops presently held by the NIC 154 and compare the counter value to the maximum number of snoops held for delayed return.

Accordingly, if there is a snoop request received by the NIC 154 which satisfies the delayed return requirement, the read snoop request manager 220 can determine whether the present counter value is less than the maximum number of held snoops. If so, the read snoop request manager 220 can delay the response and increase the counter value upon receipt of the snoop request and decrement the counter value upon returning a response to the snoop request; otherwise, if the present counter value is greater than or equal to the maximum number of held snoops, the read snoop request manager 220 can respond to the snoop request immediately (e.g., via the uncore). As such, the TOR entries will not be fully occupied by the read flag snoop requests, thereby effectively removing the potential for this possible deadlock scenario.

Figure 3:
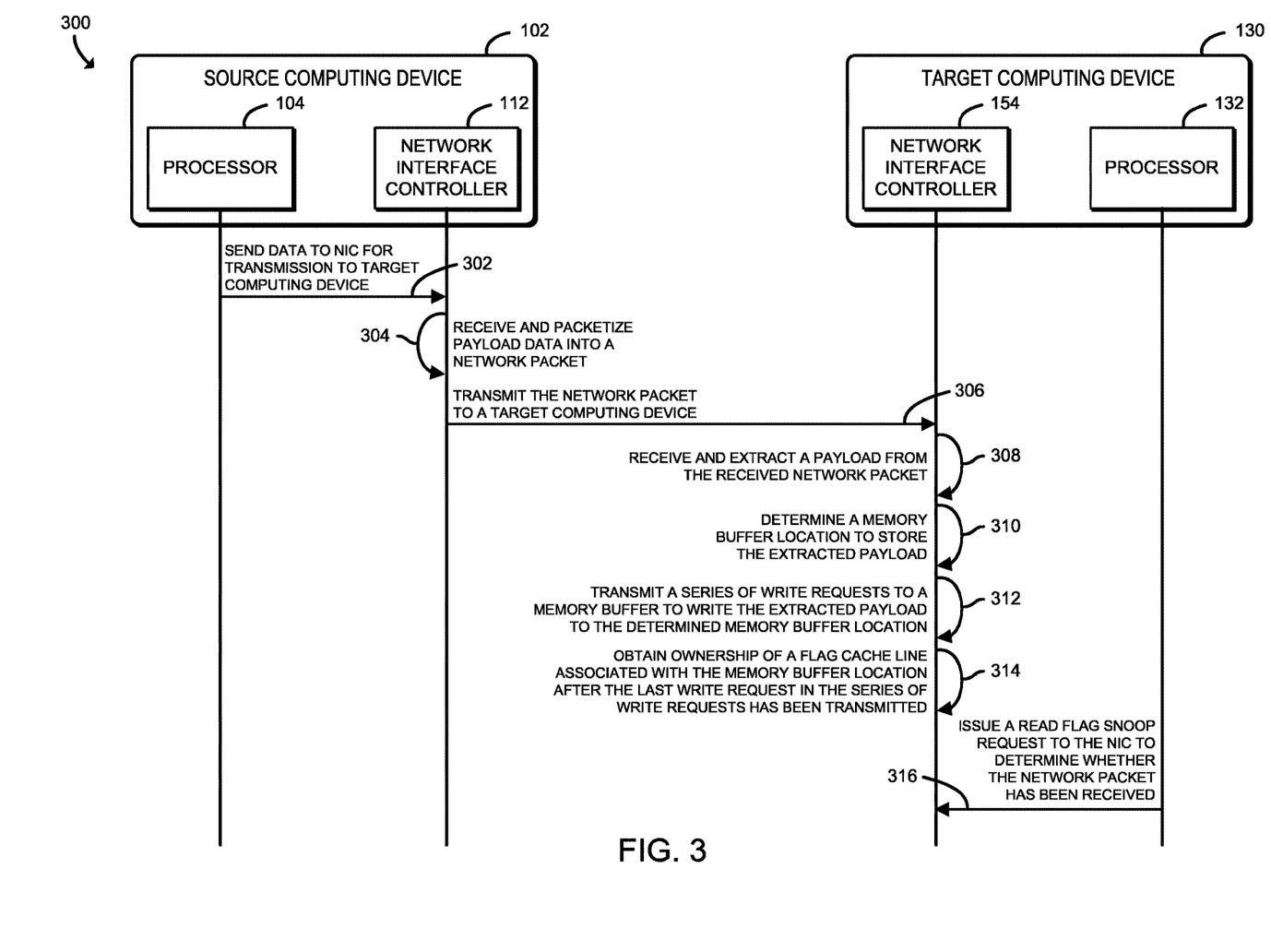
FIG. 3 is a simplified communication flow diagram of at least one embodiment for receiving and buffering, by the target computing device of FIGS. 1 and 2, a payload of a network packet transmitted by the source computing device of the system of FIG. 1.

Referring now to FIG. 3, an embodiment of a known communication flow 300 for receiving and buffering a payload of a network packet includes the source computing device 102 and the target computing device 130 communicatively coupled over a communication channel (e.g., via the network 128 of FIG. 1). The illustrative communication flow 300 includes a number of data flows, some of which may be executed separately or together, depending on the embodiment. In data flow 302, the processor 104 of the source computing device 102 sends a block of data to the network interface controller 112 of the source computing device 102. In data flow 304, the network interface controller 112 receives the data block and packetizes the data into a payload of one or more network packets. In data flow 306, the network interface controller 112 transmits the one or more network packets to the target computing device 130, or more particularly to the NIC 154 of the target computing device 130.

In data flow 308, the NIC 154 extracts payload data from a received network packet. In data flow 310, the NIC 154 determines a memory buffer location at which to store the extracted payload data. As described previously, the NIC 154 may determine the memory buffer location based on a descriptor of the network packet which corresponds to a descriptor received from the processor 132 mapped to the memory buffer location. To do so, as also described previously, the NIC 154 may extract information from the network packet, or a portion thereof (e.g., a portion of a header, the payload, etc.), or otherwise identify information associated with the network packet which is usable to determine a matching address mapping descriptor (e.g., based on the descriptor mapping information).

In data flow 312, the NIC 154 transmits a series of write requests to a memory buffer, depending on the number of cache lines necessary to write the payload (e.g., based on a size and/or type of the payload), in order to write the extracted payload to the determined memory buffer location. As described previously, the NIC 154 may first issue a corresponding number of write requests to a memory controller, a cache controller, or an agent of the memory (e.g., a cache home agent (CHA)), and subsequently write the payload data upon receiving an indication (i.e., in response to the write requests) from the memory/cache controller, or agent, that the payload data associated with the request can be written to the requested memory address.

In data flow 314, the NIC 154 gains ownership of a flag cache line associated with the memory buffer location which is usable to indicate (e.g., to the processor 132) whether the network packet has been received and stored in a data storage location (e.g., a cache memory location, a main memory location, etc.). It should be appreciated that the NIC 154 does so subsequent to having transmitted the last write request in the series of write requests to the memory buffer location, or more particularly a controller/agent of the memory buffer location. In data flow 316, in a polling manner, the processor 132 issues a read flag request to the NIC 154, or more particularly to a bus being snooped by the NIC 154, to retrieve a present value of the flag cache line associated with the received network packet.

Figure 4:
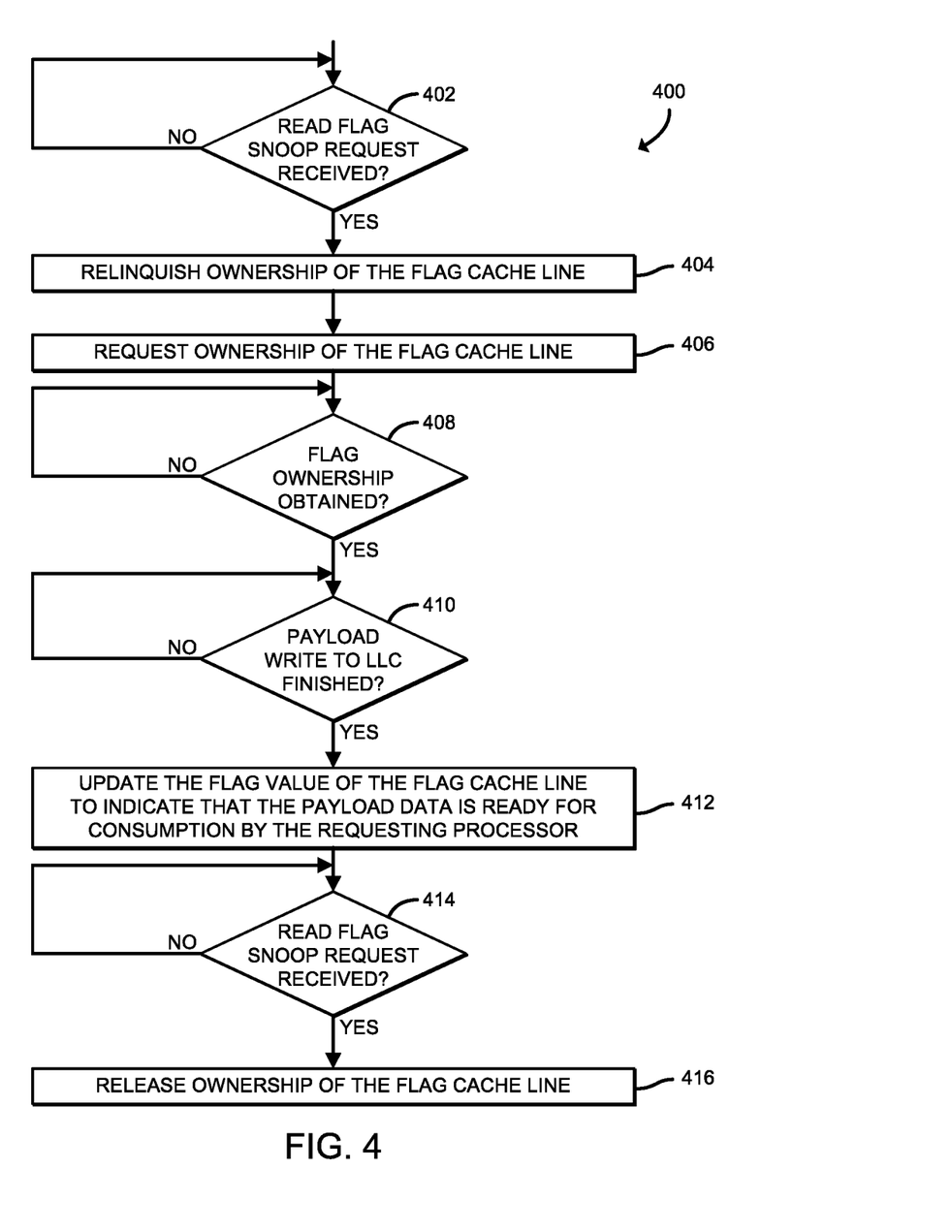
FIG. 4 is a simplified flow diagram of at least one embodiment of a typical method for managing the buffering of a payload of a received network packet.

Referring now to FIG. 4, a typical method 400 for managing the buffering of a payload of a received network packet is shown which may be executed by a NIC of a computing device. It should be appreciated that the communication flow 300 illustrated in FIG. 3 for receiving and buffering a payload of a network packet has been performed prior to the execution of the method 400 as described herein. The method 400 begins in block 402, in which the NIC determines whether a read flag snoop request has been received from a processor of the computing device. If so, the method 400 advances to block 404, in which the NIC relinquishes ownership of the flag cache line corresponding to the read flag snoop request because the flag value has not yet been updated. Accordingly, the processor can retrieve a value of the flag cache line. It should be appreciated that a memory controller/agent may be given ownership of the flag cache line to retrieve the flag value from memory and return the value to the processor. In block 406, in an effort to improve performance, the NIC requests to re-obtain ownership.

In block 408, the NIC determines whether ownership has been re-obtained. If so, the method 400 advances to block 410, in which the NIC determines whether the payload has been written to the LLC (e.g., the LLC 114 of FIG. 1) or memory (e.g., the memory 118 of FIG. 1). It should be appreciated that blocks 402 to 408 are typically repeated multiple times, as ownership of the flag is exchanged between the processor and the NIC (i.e., in a polling fashion initiated by the processor), which can have a negative impact on performance (e.g., introduces latency and increases energy usage). If the NIC determines the payload has been written to the LLC or memory, the method 400 advances to block 412, in which the NIC updates the flag value of the flag cache line to indicate that the payload data is ready for consumption by the requesting processor (e.g., sets the flag value to "1"). In block 414, the NIC determines whether another read flag snoop request has been received, and if so the method 400 advances to block 416. It should be appreciated that the additional read flag snoop request introduces latency as a mid-level cache (MLC) or a level 2 (L2) miss (see, e.g., the L2 cache 140 of FIG. 1). In block 416, the NIC releases ownership of the flag cache line in order for the processor to acquire the flag and begin processing the stored payload data.

Figure 5:
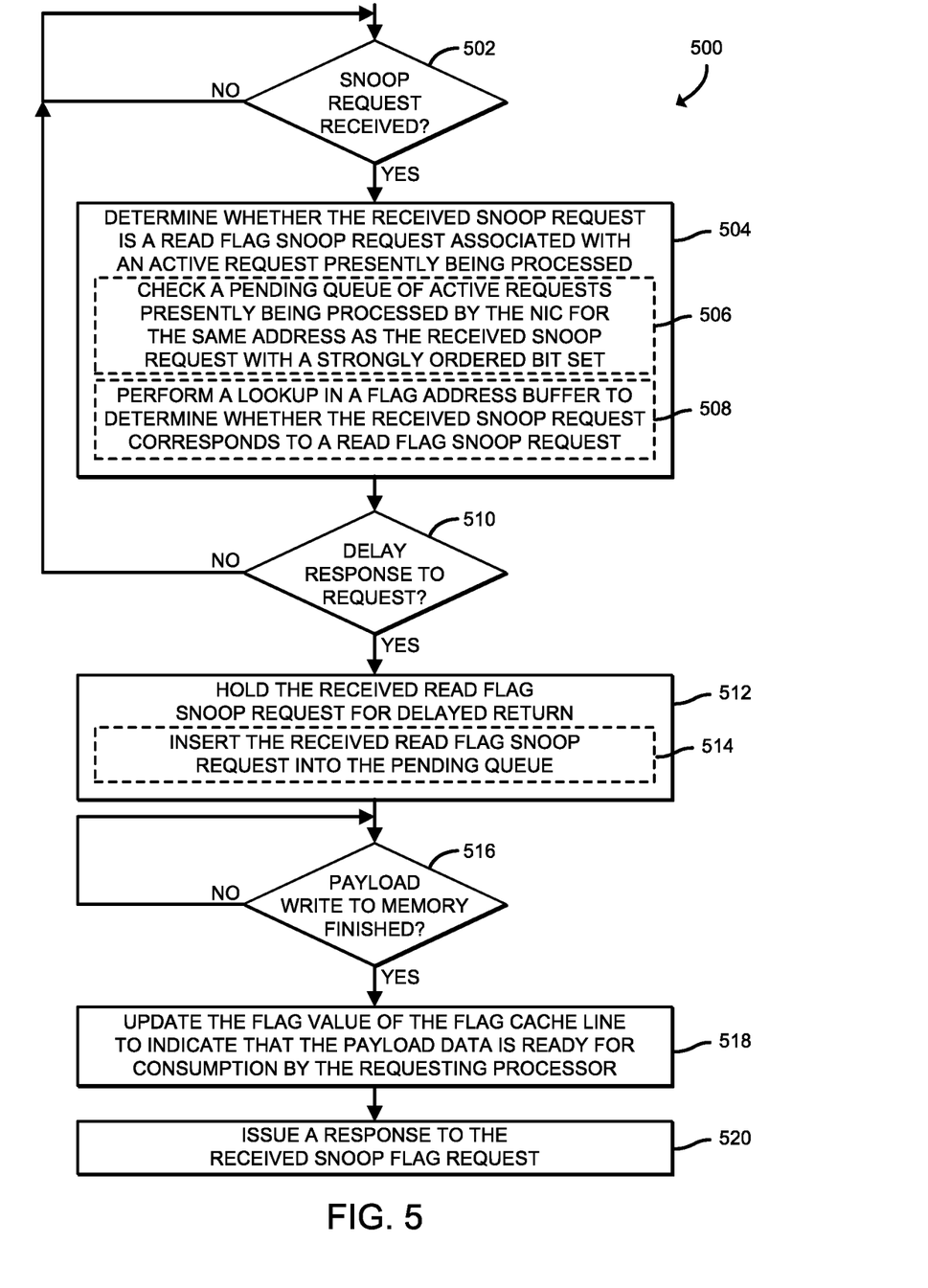
FIG. 5 is a simplified flow diagram of at least one embodiment of a method for enforcing coherence ordering in consumer polling interactions that may be executed by the target computing device of FIGS. 1 and 2.

Referring now to FIG. 5, a method 500 for enforcing coherence ordering in consumer polling interactions is shown which may be executed by a target computing device (e.g., the target computing device 130 of FIG. 1), or more particularly by the NIC 154 of the target computing device 130. It should be appreciated that the communication flow 300 illustrated in FIG. 3 for receiving and buffering a payload of a network packet has been performed prior to the execution of the method 500 as described herein. The method 500 begins in block 502, in which the NIC 154 determines whether a snoop request has been received from a processor (e.g., the processor 132 of FIG. 1) of the target computing device 130, or more particularly from the uncore (i.e., from the processor via a controller/agent). Accordingly, it should be appreciated that a snooper (e.g., the snooper 216 of FIG. 2) of the NIC 154 monitors a communication link (e.g., a communication bus) to detect snoop requests transmitted on the communication link.

If so, the method 500 advances to block 504, in which the NIC 154 determines whether the received snoop request corresponds to a read flag snoop request associated with an active request being processed by the NIC 154. In other words, the NIC 154 determines whether a response to the received snoop request should be delayed or not. To do so, in some embodiments, in block 506, the NIC 154 may check a pending queue of active requests presently being processed by the NIC 154 for the same address as the received snoop request with a strongly ordered bit set. Alternatively, in other embodiments, in block 508, the NIC 154 may perform a lookup in a flag address buffer to determine whether the address of the received snoop request corresponds to an address entry presently stored in the flag address buffer. Accordingly, in such embodiments, if a matching entry is found in the flag address buffer, the NIC 154 can determine that the received snoop request corresponds to a read flag snoop request.

In block 510, the NIC 154 determines whether to delay a response to the received snoop request based on the determination performed in block 504 (e.g., determined using either technique described in blocks 506 and 508). In other words, the NIC 154 determines whether to delay the response if the received snoop request is a read flag snoop request associated with an active request being processed by the NIC 154 as described above. If the NIC 154 determines the received snoop request is a read flag snoop request associated with an active request being processed by the NIC 154, the method 500 advances to block 512. In block 512, the NIC 154 holds the received read flag snoop request for a delayed return. To do so, in some embodiments, in block 514, the NIC 154 may insert the received read flag snoop request into a pending queue of active requests presently being processed by the NIC 154. As such, unlike existing technologies, since the read flag snoop request is not answered (i.e., a response is not returned), the NIC 154 does not need to relinquish ownership of the flag cache line for the processor 132 to read the value, nor does the NIC 154 need to re-obtain ownership of the flag cache line thereafter.

In block 516, the NIC 154 determines whether the payload has been written to the appropriate location in memory, such as a LLC (e.g., the LLC 142 of FIG. 1) or memory (e.g., the memory 118 of FIG. 1). If so, the method 500 advances to block 518, in which the NIC 154 updates the flag value of the flag cache line to indicate that the payload data is ready for consumption by the requesting processor 132 (e.g., sets the flag value to "1"). Accordingly, the processor can take ownership of the flag cache line upon subsequent request. In block 520, the NIC 154 issues a response to the received snoop flag request. Accordingly, the processor 132 is likely to receive the response at the earliest possible time, avoiding the processor 132 triggering and re-triggering (see, e.g., the method 400 of FIG. 4) which, as noted previously, introduces latency and additional energy consumption.

It should be appreciated that, in some embodiments, the method 500 may be embodied as various instructions stored on a computer-readable media, which may be executed by a processor (e.g., the processor 132), the communication circuitry 152, and/or other components of the target computing device 130 to cause the target computing device 130 to perform at least a portion of the method 500. The computer-readable media may be embodied as any type of media capable of being read by the target computing device 130 including, but not limited to, the memory 146, the data storage device 148, other memory or data storage devices of the target computing device 130, portable media readable by a peripheral device of the target computing device 130, and/or other media.

While the operations herein are described as being performed by the NIC 154, it should be appreciated that other components of the target computing device 130 (e.g., a processor, a GPU, an accelerator, etc.) may perform one or more of the methods described herein. In other words, the operations described herein may be performed by any component of a computing device which processes some data, writes the data to a location in memory, writes a flag to inform a consumer component that the data written to memory is ready, and the consumer component is configured to poll the flag to determine whether the data written to memory is ready. Accordingly, it should be appreciated that in such alternative embodiments, the data does not need to be a network packet received by a NIC.

EXAMPLES

Illustrative examples of the technologies disclosed herein are provided below. An embodiment of the technologies may include any one or more, and any combination of, the examples described below.

Example 1 includes a target computing device for enforcing coherence ordering in consumer polling interactions, the target computing device comprising a network interface controller (NIC); one or more processors; and one or more data storage devices having stored therein a plurality of instructions that, when executed by the one or more processors, cause the target computing device to transmit, upon having received a network packet, one or more write requests to a data storage device of the one or more data storage devices, wherein each of the one or more write requests is usable to initiate the storage of at least a portion of a payload of the received network packet to the data storage device; obtain, by the NIC and subsequent to having transmitted a last write request of the one or more write requests, ownership of a flag cache line of a plurality of cache lines in a cache of the target computing device, wherein a value of the flag cache line indicates whether the network packet has been written to the data storage device; receive, by the NIC, a snoop request from a processor of the one or more processors; identify, by the NIC, whether the received snoop request corresponds to a read flag snoop request associated with an active request being processed by the NIC, hold, by the NIC and in response to having identified the received snoop request as the read flag snoop request, the received snoop request for delayed return; determine, by the NIC, whether each of the one or more write requests has returned successfully; update, by the NIC and subsequent to having determined that each of the one or more write requests has returned successfully, the value of the flag cache line to indicate the payload has been written to the data storage device; and issue, by the NIC and subsequent to having updated the value of the flag cache line, a response to the processor responding to the received snoop request.

Example 2 includes the subject matter of Example 1, and wherein to determine whether each of the one or more write requests has returned successfully comprises to determine whether a respective portion of the payload associated with each of the one or more write requests has been successfully written to a last-level cache of the target computing device.

Example 3 includes the subject matter of any of Examples 1 and 2, and wherein to determine whether each of the one or more write requests has returned successfully comprises to determine whether a respective portion of the payload associated with each of the one or more write requests has been successfully written to a main memory of the target computing device.

Example 4 includes the subject matter of any of Examples 1-3, and wherein to identify whether the received snoop request corresponds to the read flag snoop request comprises to determine whether the received snoop request corresponds to one of the plurality of flag cache lines.

Example 5 includes the subject matter of any of Examples 1-4, and wherein to identify whether the received snoop request corresponds to the read flag snoop request comprises to perform a lookup in a flag address buffer to determine whether the address of the received snoop request matches a presently stored address entry of the flag address buffer.

Example 6 includes the subject matter of any of Examples 1-5, and wherein to identify whether the received snoop request corresponds to the read flag snoop request comprises to check a pending queue of active requests presently being processed by the NIC for an active request which has the same address as the received snoop request.

Example 7 includes the subject matter of any of Examples 1-6, and wherein to identify whether the received snoop request corresponds to the read flag snoop request comprises to identify the active request which has the same address as the received snoop request and a strongly ordered bit set indicating the received snoop request is a read flag snoop request.

Example 8 includes the subject matter of any of Examples 1-7, and wherein to hold the received snoop request for delayed return includes to insert the received snoop request into the pending queue.

Example 9 includes the subject matter of any of Examples 1-8, and wherein to hold the received snoop request additionally comprises to determine whether a present number of previously received snoop requests in the pending queue meets or exceeds a maximum number of held snoop requests.

Example 10 includes the subject matter of any of Examples 1-9, and wherein the plurality of instructions further cause the target computing device to determine the maximum number of held snoop requests as a function of a total number of entries of a table of requests (TOR) managed by a memory agent of the processor and a total number of NICs of the target computing device.

Example 11 includes a method for enforcing coherence ordering in consumer polling interactions, the method comprising transmitting, by a network interface controller (NIC) of a target computing device, upon having received a network packet, one or more write requests to a data storage device of the target computing device, wherein each of the one or more write requests is usable to initiate the storage of at least a portion of a payload of the received network packet to the data storage device; obtaining, by the NIC and subsequent to having transmitted a last write request of the one or more write requests, ownership of a flag cache line of a plurality of cache lines in a cache of the target computing device, wherein a value of the flag cache line indicates whether the network packet has been written to the data storage device; receiving, by the NIC, a snoop request from a processor of the one or more processors; identifying, by the NIC, whether the received snoop request corresponds to a read flag snoop request associated with an active request being processed by the NIC, holding, by the NIC and in response to having identified the received snoop request as the read flag snoop request, the received snoop request for delayed return; determining, by the NIC, whether each of the one or more write requests has returned successfully; updating, by the NIC and subsequent to having determined that each of the one or more write requests has returned successfully, the value of the flag cache line to indicate the payload has been written to the data storage device; and issuing, by the NIC and subsequent to having updated the value of the flag cache line, a response to the processor responding to the received snoop request.

Example 12 includes the subject matter of Example 11, and wherein determining whether each of the one or more write requests has returned successfully comprises determining whether a respective portion of the payload associated with each of the one or more write requests has been successfully written to a last-level cache of the target computing device.

Example 13 includes the subject matter of any of Examples 11 and 12, and wherein determining whether each of the one or more write requests has returned successfully comprises determining whether a respective portion of the payload associated with each of the one or more write requests has been successfully written to a main memory of the target computing device.

Example 14 includes the subject matter of any of Examples 11-13, and wherein identifying whether the received snoop request corresponds to the read flag snoop request comprises determining whether the received snoop request corresponds to one of the plurality of flag cache lines.

Example 15 includes the subject matter of any of Examples 11-14, and wherein identifying whether the received snoop request corresponds to the read flag snoop request comprises performing a lookup in a flag address buffer to determine whether the address of the received snoop request matches a presently stored address entry of the flag address buffer.

Example 16 includes the subject matter of any of Examples 11-15, and wherein identifying whether the received snoop request corresponds to the read flag snoop request comprises checking a pending queue of active requests presently being processed by the NIC for an active request which has the same address as the received snoop request.

Example 17 includes the subject matter of any of Examples 11-16, and wherein identifying whether the received snoop request corresponds to the read flag snoop request comprises identifying the active request which has the same address as the received snoop request and a strongly ordered bit set indicating the received snoop request is a read flag snoop request.

Example 18 includes the subject matter of any of Examples 11-17, and wherein holding the received snoop request for delayed return includes inserting the received snoop request into the pending queue.

Example 19 includes the subject matter of any of Examples 11-18, and wherein holding the received snoop request additionally comprises determining whether a present number of previously received snoop requests in the pending queue meets or exceeds a maximum number of held snoop requests.

Example 20 includes the subject matter of any of Examples 11-19, and wherein the plurality of instructions further cause the target computing device to determine the maximum number of held snoop requests as a function of a total number of entries of a table of requests (TOR) managed by a memory agent of the processor and a total number of NICs of the target computing device.

Example 21 includes one or more machine-readable storage media of a target computing device comprising a plurality of instructions stored thereon that, when executed, cause the target computing device of to perform the method of any of Examples 11-20.

Example 22 includes a target computing device for enforcing coherence ordering in consumer polling interactions, the target computing device comprising one or more processors; and one or more memory devices having stored therein a plurality of instructions that, when executed by the one or more processors, cause the target computing device to perform the method of any of Examples 11-20.

Example 23 includes a target computing device for enforcing coherence ordering in consumer polling interactions, the target computing device comprising ingress/egress management circuitry to (i) receive a network packet from another computing device and (ii) transmit, upon having received a network packet, one or more write requests to a data storage device of the target computing device, wherein each of the one or more write requests is usable to initiate the storage of at least a portion of a payload of the received network packet to the data storage device; payload buffer management circuitry to obtain, subsequent to having transmitted a last write request of the one or more write requests, ownership of a flag cache line of a plurality of cache lines in a cache of the target computing device, wherein a value of the flag cache line indicates whether the network packet has been written to the data storage device; snooper circuitry to receive a snoop request from a processor of the one or more processors; means for identifying whether the received snoop request corresponds to a read flag snoop request associated with an active request being processed by the NIC; and means for holding, in response to having identified the received snoop request as the read flag snoop request, the received snoop request for delayed return, wherein the payload buffer management circuitry is further to: (i) determine whether each of the one or more write requests has returned successfully and (ii) update, subsequent to having determined that each of the one or more write requests has returned successfully, the value of the flag cache line to indicate the payload has been written to the data storage device, and the target computing device further comprises read snoop request management circuitry to issue, subsequent to having updated the value of the flag cache line, a response to the processor responding to the received snoop request.

Example 24 includes the subject matter of Example 23, and wherein to determine whether each of the one or more write requests has returned successfully comprises to determine whether a respective portion of the payload associated with each of the one or more write requests has been successfully written to a last-level cache of the target computing device.

Example 25 includes the subject matter of any of Examples 23 and 24, and wherein to determine whether each of the one or more write requests has returned successfully comprises to determine whether a respective portion of the payload associated with each of the one or more write requests has been successfully written to a main memory of the target computing device.

Example 26 includes the subject matter of any of Examples 23-25, and wherein the means for identifying whether the received snoop request corresponds to the read flag snoop request comprises means for determining whether the received snoop request corresponds to one of the plurality of flag cache lines.

Example 27 includes the subject matter of any of Examples 23-26, and wherein the means for identifying whether the received snoop request corresponds to the read flag snoop request comprises means for performing a lookup in a flag address buffer to determine whether the address of the received snoop request matches a presently stored address entry of the flag address buffer.

Example 28 includes the subject matter of any of Examples 23-27, and wherein the means for identifying whether the received snoop request corresponds to the read flag snoop request comprises means for checking a pending queue of active requests presently being processed by the NIC for an active request which has the same address as the received snoop request.

Example 29 includes the subject matter of any of Examples 23-28, and wherein the means for identifying whether the received snoop request corresponds to the read flag snoop request comprises means for identifying the active request which has the same address as the received snoop request and a strongly ordered bit set indicating the received snoop request is a read flag snoop request.

Example 30 includes the subject matter of any of Examples 23-29, and wherein the means for holding the received snoop request for delayed return includes means for inserting the received snoop request into the pending queue.

Example 31 includes the subject matter of any of Examples 23-30, and wherein the means for holding the received snoop request additionally comprises means for determining whether a present number of previously received snoop requests in the pending queue meets or exceeds a maximum number of held snoop requests.

Example 32 includes the subject matter of any of Examples 23-31, and wherein the target computing device further comprises means for determining the maximum number of held snoop requests as a function of a total number of entries of a table of requests (TOR) managed by a memory agent of the processor and a total number of NICs of the target computing device.

The invention claimed is:

1. A target computing device for enforcing coherence ordering in consumer polling interactions, the target computing device comprising:
   a network interface controller (NIC);
   one or more processors; and
   one or more data storage devices having stored therein a plurality of instructions that, when executed by the one or more processors, cause the target computing device to:
      transmit, by the NIC and subsequent to having received a network packet, one or more write requests to a data storage device of the one or more data storage devices, wherein each of the one or more write requests is usable to initiate storage of at least a portion of a payload of the received network packet to the data storage device;
      obtain, by the NIC and subsequent to having transmitted a last write request of the one or more write requests, ownership of a flag cache line of a plurality of cache lines in a cache of the target computing device, wherein a value of the flag cache line indicates whether the network packet has been written to the data storage device;
      receive, by the NIC, a snoop request from a processor of the one or more processors;
      identify, by the NIC, whether the received snoop request corresponds to a read flag snoop request associated with an active request being processed by the NIC;
      hold, by the NIC and in response to having identified the received snoop request as the read flag snoop request, the received snoop request for delayed return;
      determine, by the NIC, whether each of the one or more write requests has returned successfully;
      update, by the NIC and subsequent to having determined that each of the one or more write requests has returned successfully, the value of the flag cache line to indicate the payload has been written to the data storage device; and
      issue, by the NIC and subsequent to having updated the value of the flag cache line, a response to the processor responding to the received snoop request.

2. The target computing device of claim 1, wherein to determine whether each of the one or more write requests has returned successfully comprises to determine whether a respective portion of the payload associated with each of the one or more write requests has been successfully written to a last-level cache of the target computing device.

3. The target computing device of claim 1, wherein to determine whether each of the one or more write requests has returned successfully comprises to determine whether a respective portion of the payload associated with each of the one or more write requests has been successfully written to a main memory of the target computing device.

4. The target computing device of claim 1, wherein to identify whether the received snoop request corresponds to the read flag snoop request comprises to determine whether the received snoop request corresponds to one of a plurality of flag cache lines.

5. The target computing device of claim 1, wherein to identify whether the received snoop request corresponds to the read flag snoop request comprises to perform a lookup in a flag address buffer to determine whether an address of the received snoop request matches a presently stored address entry of the flag address buffer.

6. The target computing device of claim 1, wherein to identify whether the received snoop request corresponds to the read flag snoop request comprises to check a pending queue of active requests presently being processed by the NIC for an active request which has a same address as the received snoop request.

7. The target computing device of claim 6, wherein to identify whether the received snoop request corresponds to the read flag snoop request comprises to identify the active request which has the same address as the received snoop request and a strongly ordered bit set indicating the received snoop request is a read flag snoop request.

8. The target computing device of claim 6, wherein to hold the received snoop request for delayed return includes to insert the received snoop request into the pending queue.

9. The target computing device of claim 6, wherein to hold the received snoop request additionally comprises to determine whether a present number of previously received snoop requests in the pending queue meets or exceeds a maximum number of held snoop requests to avoid a deadlock scenario.

10. The target computing device of claim 9, wherein the plurality of instructions further cause the target computing device to determine the maximum number of held snoop requests as a function of a total number of entries of a table of requests (TOR) managed by a memory agent of the processor and a total number of NICs of the target computing device.

11. One or more machine-readable storage media comprising a plurality of instructions stored thereon that, in response to being executed, cause a target computing device to:
  transmit, by a network interface controller (NIC) of the target computing device and subsequent to having received a network packet from another computing device, one or more write requests to a data storage device of the target computing device, wherein each of the one or more write requests is usable to initiate storage of at least a portion of a payload of the received network packet to the data storage device;
  obtain, by the NIC and subsequent to having transmitted a last write request of the one or more write requests, ownership of a flag cache line of a plurality of cache lines in a cache of the target computing device, wherein a value of the flag cache line indicates whether the network packet has been written to the data storage device;
  receive, by the NIC, a snoop request from a processor of the target computing device;
  identify, by the NIC, whether the received snoop request corresponds to a read flag snoop request associated with an active request being processed by the NIC;
  hold, by the NIC and in response to having identified the received snoop request as the read flag snoop request, the received snoop request for delayed return;
  determine, by the NIC, whether each of the one or more write requests has returned successfully;
  update, by the NIC and subsequent to having determined that each of the one or more write requests has returned successfully, the value of the flag cache line to indicate the payload has been written to the data storage device; and
  issue, by the NIC and subsequent to having updated the value of the flag cache line, a response to the processor responding to the received snoop request.

12. The one or more machine-readable storage media of claim 11, wherein to determine whether each of the one or more write requests has returned successfully comprises to determine whether a respective portion of the payload associated with each of the one or more write requests has been successfully written to a last-level cache of the target computing device.

13. The one or more machine-readable storage media of claim 11, wherein to determine whether each of the one or more write requests has returned successfully comprises to determine whether a respective portion of the payload associated with each of the one or more write requests has been successfully written to a main memory of the target computing device.

14. The one or more machine-readable storage media of claim 11, wherein to identify whether the received snoop request corresponds to the read flag snoop request comprises to determine whether the received snoop request corresponds to one of a plurality of flag cache lines.

15. The one or more machine-readable storage media of claim 11, wherein to identify whether the received snoop request corresponds to the read flag snoop request comprises to perform a lookup in a flag address buffer to determine whether an address of the received snoop request matches a presently stored address entry of the flag address buffer.

16. The one or more machine-readable storage media of claim 11, wherein to identify whether the received snoop request corresponds to the read flag snoop request comprises to check a pending queue of active requests presently being processed by the NIC for an active request which has a same address as the received snoop request.

17. The one or more machine-readable storage media of claim 16, wherein to identify whether the received snoop request corresponds to the read flag snoop request comprises to identify the active request which has the same address as the received snoop request and a strongly ordered bit set indicating the received snoop request is a read flag snoop request.

18. The one or more machine-readable storage media of claim 16, wherein to hold the received snoop request for delayed return includes to insert the received snoop request into the pending queue.

19. The one or more machine-readable storage media of claim 16, wherein to hold the received snoop request additionally comprises to determine whether a present number of previously received snoop requests in the pending queue meets or exceeds a maximum number of held snoop requests to avoid a deadlock scenario.

20. The one or more machine-readable storage media of claim 19, wherein the plurality of instructions further cause the target computing device to determine the maximum number of held snoop requests as a function of a total number of entries of a table of requests (TOR) managed by a memory agent of the processor and a total number of NICs of the target computing device.

21. A method for enforcing coherence ordering in consumer polling interactions, the method comprising:

transmitting, by a network interface controller (NIC) of a target computing device, upon having received a network packet, one or more write requests to a data storage device of the target computing device, wherein each of the one or more write requests is usable to initiate storage of at least a portion of a payload of the received network packet to the data storage device;

obtaining, by the NIC and subsequent to having transmitted a last write request of the one or more write requests, ownership of a flag cache line of a plurality of cache lines in a cache of the target computing device, wherein a value of the flag cache line indicates whether the network packet has been written to the data storage device;

receiving, by the NIC, a snoop request from a processor of one or more processors;

identifying, by the NIC, whether the received snoop request corresponds to a read flag snoop request associated with an active request being processed by the NIC, holding, by the NIC and in response to having identified the received snoop request as the read flag snoop request, the received snoop request for delayed return;

determining, by the NIC, whether each of the one or more write requests has returned successfully;

updating, by the NIC and subsequent to having determined that each of the one or more write requests has returned successfully, the value of the flag cache line to indicate the payload has been written to the data storage device; and issuing, by the NIC and subsequent to having updated the value of the flag cache line, a response to the processor responding to the received snoop request.

22. The method of claim 21, wherein determining whether each of the one or more write requests has returned successfully comprises determining whether a respective portion of the payload associated with each of the one or more write requests has been successfully written to one of a last-level cache of the target computing device or a main memory of the target computing device.

23. The method of claim 21, wherein identifying whether the received snoop request corresponds to the read flag snoop request comprises one of: (i) determining whether the received snoop request corresponds to one of a plurality of flag cache lines or (ii) performing a lookup in a flag address buffer to determine whether an address of the received snoop request matches a presently stored address entry of the flag address buffer.

24. The method of claim 21, wherein identifying whether the received snoop request corresponds to the read flag snoop request comprises checking a pending queue of active requests presently being processed by the NIC for an active request which has a same address as the received snoop request.

25. The method of claim 24, wherein identifying whether the received snoop request corresponds to the read flag snoop request comprises identifying the active request which has the same address as the received snoop request and a strongly ordered bit set indicating the received snoop request is a read flag snoop request.

* * * * *